No. 813,947. PATENTED FEB. 27, 1906.
A. J. CAMPBELL.
PROP FOR CLOTHES LINES.
APPLICATION FILED JULY 12, 1904.
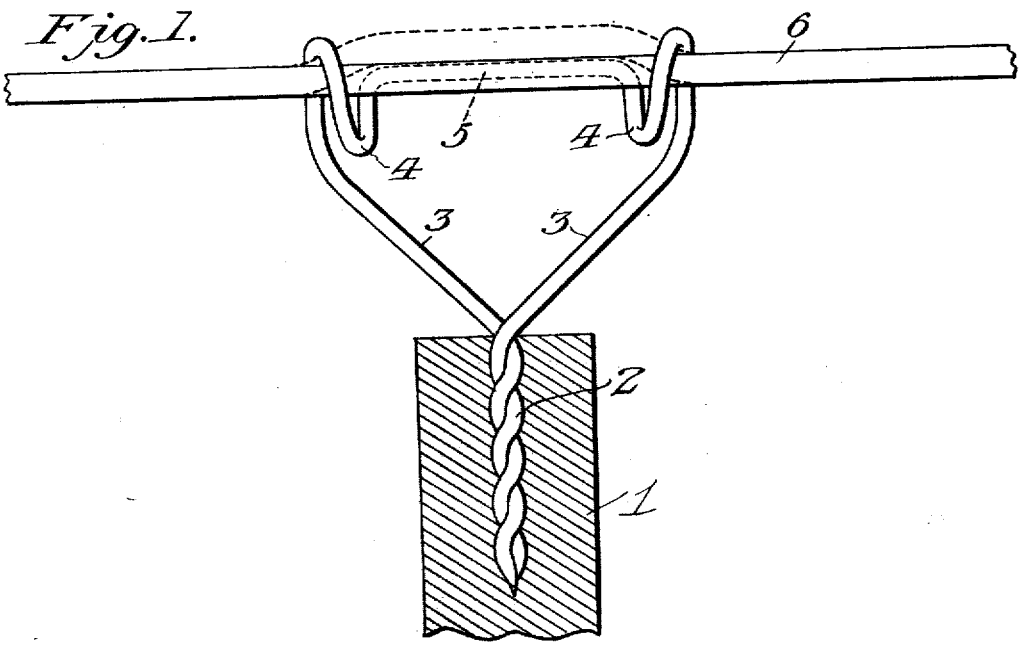
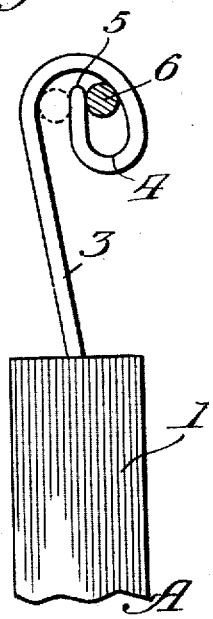
WITNESSES:
Edwin F. McKee
Herbert D. Lawson
INVENTOR
J. Campbell
BY
Victor J. Evans
Attorney

UNITED STATES PATENT OFFICE.

ADONIRAM J. CAMPBELL, OF BERWYN, PENNSYLVANIA.

PROP FOR CLOTHES-LINES.

No. 813,947.   Specification of Letters Patent.   Patented Feb. 27, 1906.

Application filed July 12, 1904. Serial No. 216,285.

*To all whom it may concern:*

Be it known that I, ADONIRAM J. CAMPBELL, a citizen of the United States, residing at Berwyn, in the county of Chester and State of Pennsylvania, have invented new and useful Improvements in Props for Clothes-Lines, of which the following is a specification.

My invention relates to props for clothes-lines; and its object is to provide a simple and inexpensive device of this character which can be readily attached to a clothes-line and which will always assume a position practically at right angles to the line.

A further object is to provide a prop which will remain attached to the line whether or not the same is subjected to considerable movement by wind.

With the above and other objects in view the invention consists of a pole of suitable length having oppositely-extending arms projecting from one end thereof, each arm terminating in an inwardly-extending spiral hook, the two hooks being connected by an integral cross-piece.

The invention also consists in the further novel construction and combination of parts, hereinafter more fully described and claimed, and illustrated in the accompanying drawings, showing the preferred form of my invention, and in which—

Figure 1 is a front elevation of the head of the prop in engagement with a line, the upper portion of the pole being shown in section and the position assumed by the line while being placed in engagement with the head being shown by dotted lines; and Fig. 2 is a side elevation of the head of the prop, the line being shown in section.

Referring to the figures by numerals of reference, 1 is a pole of any suitable length and material in which is secured a stem 2, preferably formed of twisted wire, having a sharp-pointed end 2' to permit of its being readily secured into one end of the pole. Oppositely-extending arms 3 project from this stem and terminate in inwardly-extending spiral hooks 4, the ends of which are connected by an integral cross-rod 5, which is arranged, preferably, at right angles to the pole 1. The arms 3, hooks 4, and rod 5 form the head of the prop and the entire head is, as shown, preferably formed in a single strip of metal.

When it is desired to secure the prop-head to a clothes-line 6, the spiral hooks 4 are placed over the line and the head drawn downward until the line assumes the positions shown by dotted lines in Fig. 2. That portion of the line between the two hooks 4 is then pressed upward, as shown in dotted lines in Fig. 1, and forced over the cross-rod 5 and the inner ends of the hooks 4, thereby bringing the line into position in the centers of the hooks 4, so as to contact with the cross-rod 5, and arranged parallel therewith, from which position it cannot be removed except by reversing the operation above described. As the hooks 4 are spaced apart a considerable distance, the pole 1 is held thereby normally substantially at right angles to the line 6, and in the event of a heavy wind storm the pole will be held in this position and will maintain its proper relation to the line at all times.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

A clothes-line prop comprising a head constructed of a single length of wire having its ends twisted together in spiral form, and provided with a sharp-pointed end, a pair of arms diverging upwardly from said spiral twist and provided respectively with spiral hooks having inner upturned portions, said hooks being spaced in a direction parallel with the longitudinal axis of a clothes-line, and a cross-bar connecting the terminals of the upturned portions of the hooks, and the clothes-line serving to contact with the cross-bar and arranged parallel therewith when said line is engaged by said hooks, substantially as specified.

In testimony whereof I affix my signature in presence of two witnesses.

ADONIRAM J. CAMPBELL.

Witnesses:
 JOHN BLACKWOOD,
 MARY P. GARBER.